United States Patent
Yajima (10) Patent No.: US 8,065,412 B2
(45) Date of Patent: Nov. 22, 2011

(54) INFORMATION PROCESSING APPARATUS FOR OBTAINING ADDRESS INFORMATION BY A SERVER APPARATUS OF DEVICES IN A CLIENT APPARATUS

(75) Inventor: Masao Yajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/255,718

(22) Filed: Oct. 22, 2008

(65) Prior Publication Data

US 2009/0113046 A1  Apr. 30, 2009

(30) Foreign Application Priority Data

Oct. 26, 2007  (JP) .................................. 2007-279441

(51) Int. Cl.
*G06F 15/173* (2006.01)
(52) U.S. Cl. .......................... 709/224; 709/223; 709/225
(58) Field of Classification Search ........... 709/223–225
See application file for complete search history.

(56) References Cited

U.S. PATENT DOCUMENTS

| | | | | |
|---|---|---|---|---|
| 6,490,632 B1* | 12/2002 | Vepa et al. | ..................... | 709/250 |
| 6,590,861 B1* | 7/2003 | Vepa et al. | ..................... | 370/216 |
| 7,505,401 B2* | 3/2009 | Kashyap | ..................... | 370/217 |
| 7,742,402 B2* | 6/2010 | Yamakawa | ..................... | 370/220 |
| 7,760,619 B2* | 7/2010 | Abdulla et al. | ............... | 370/216 |
| 2004/0028048 A1* | 2/2004 | Jin | ................. | 370/392 |
| 2007/0097869 A1* | 5/2007 | Wang et al. | ................... | 370/241 |
| 2009/0059945 A1* | 3/2009 | Yokomitsu et al. | .......... | 370/419 |
| 2010/0287271 A1* | 11/2010 | Tabbara et al. | .............. | 709/223 |

FOREIGN PATENT DOCUMENTS

| JP | 7-30981 | 1/1995 |
|---|---|---|
| JP | 2003-273885 | 9/2003 |

* cited by examiner

*Primary Examiner* — Mohamed Wasel
(74) *Attorney, Agent, or Firm* — Staas & Halsey LLP

(57) ABSTRACT

A server apparatus connected to a plurality of client apparatuses capable of sending out a message containing environment information to the server apparatus. The server apparatus has a storage for storing environment information in association with each of the client apparatuses and a processor for receiving a message including updated environment information indicative of addition of an interface device connected to the client apparatus from the client apparatus and for updating the environment information in the storage with the updated environment information.

6 Claims, 9 Drawing Sheets

FIG. 3

| Target ID | Startup ID | MAC address | MAC address length |
|---|---|---|---|
| 001 | 1 | MAC A~MAC D | ... |
| 002 | 1 | MAC F~MAC K | ... |
| ... | ... | ... | ... |
| ... | ... | ... | ... |

Management table

INFORMATION PROCESSING APPARATUS FOR OBTAINING ADDRESS INFORMATION BY A SERVER APPARATUS OF DEVICES IN A CLIENT APPARATUS

BACKGROUND

The present technique relates to communication in redundancy management LAN (local area network) environments in network systems for business entities and so on. The present technique relates to a communication management program for causing a computer to execute processing for managing communication with client apparatuses through a network and for responding to a predetermined request received from each client apparatus and also to a communication management method and a communication management apparatus which implement the communication management program.

In order to improve the management efficiency through computerization of correspondence and so on in business activities, network systems, such as LANs (e.g., Japanese Unexamined Patent Application Publication No. 2003-273885) is build. When a LAN is installed in a business entity as a network system, it is common to provide the LAN with redundancy for, for example, a network-system downtime due to a failure.

Figure 7:
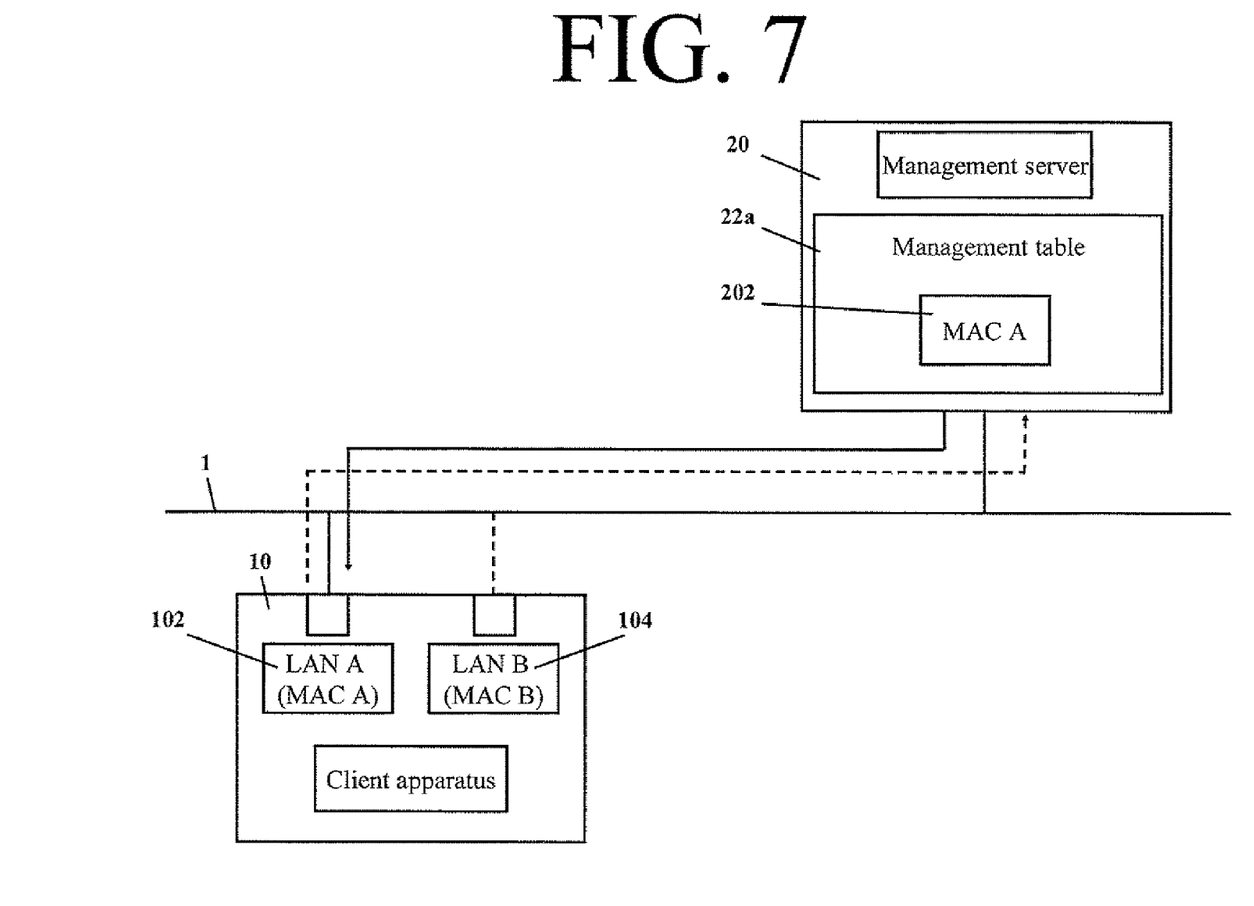
FIG. 7 is a diagram illustrating a known technology.

A known technology for a redundancy management LAN will be briefly described with reference to FIG. 7. As illustrated in FIG. 7, a client apparatus is quipped with redundancy LAN cards, which include a LAN card A 102 (e.g., LAN A) that is usually used for communication through a LAN and a LAN card B 104 (e.g., LAN B) that is used, through switching, for communication with a management server when the LAN card A fails.

The management server shown in FIG. 7 pre-registers, in a management table, a MAC (media access control) address (e.g., MAC A 202) associated with the LAN card A that is usually used by the client apparatus.

For example, upon receiving a PXE (Preboot eXecution Environment) startup request or the like from the client apparatus, the management server determines whether or not a MAC address indicating the transmission source of the request is already registered in the management table. When the MAC address indicating the transmission source and the MAC address registered in the management table match each other, the management server responds to the request, and when the MAC addresses do not match each other, the management server rejects the request.

There is a Japanese Laid-open Patent Publication No. 2003-273885.

However, in the known technology, the management server cannot respond to a case in which switching between LAN cards is performed at the client apparatus, and thus has a problem of rejecting a request from the client apparatus.

Figure 8:
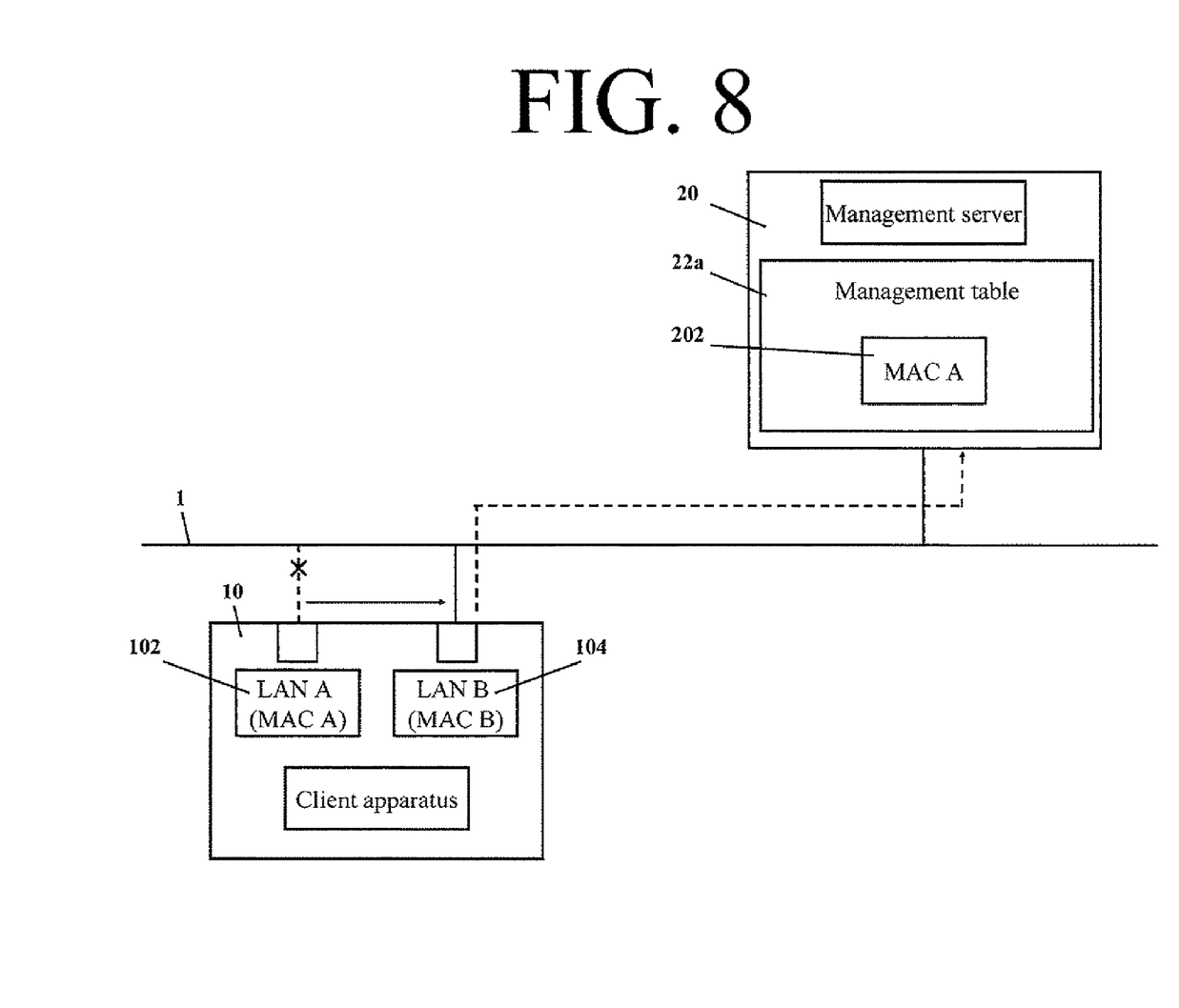
FIG. 8 is a diagram illustrating the known technology.

That is, as shown in FIG. 8, when the LAN card A fails, the client apparatus performs switching from the LAN card A to the LAN card B and transmits, to the management server, a request for permitting the LAN card B as a transmission source. Upon receiving the request from the client apparatus, however, the management server rejects the request from the client, when a MAC address (e.g., MAC B 204) indicating the transmission source of the request does not match a MAC address (e.g., MAC A) registered in the management table. The known technology, therefore, has a problem in that communication may not be established between the management server and the client apparatus.

SUMMARY

According to an aspect of an embodiment, a server apparatus connected to a plurality of client apparatuses capable of sending out a message containing environment information to the server apparatus, the server apparatus has a storage for storing environment information in association with each of the client apparatuses and a processor for receiving a message including updated environment information indicative of addition of an interface device connected to the client apparatus from the client apparatus and for updating the environment information in the storage with the updated environment information.

DESCRIPTION OF THE PREFERRED EMBODIMENTS

A communication management program, a communication management method, and a communication management apparatus according embodiments of the present technique will be described below with reference to the accompanying drawings. A management server to which a communication management program according to the present technique is applied will first be described in a first embodiment and other embodiments encompassed by the present technique will then be described.

First Embodiment

An overview and features of a management server according to a first embodiment, the configuration of the management server, the processing of the management server and advantages of the first embodiment will be described below in that order.

Figure 1:
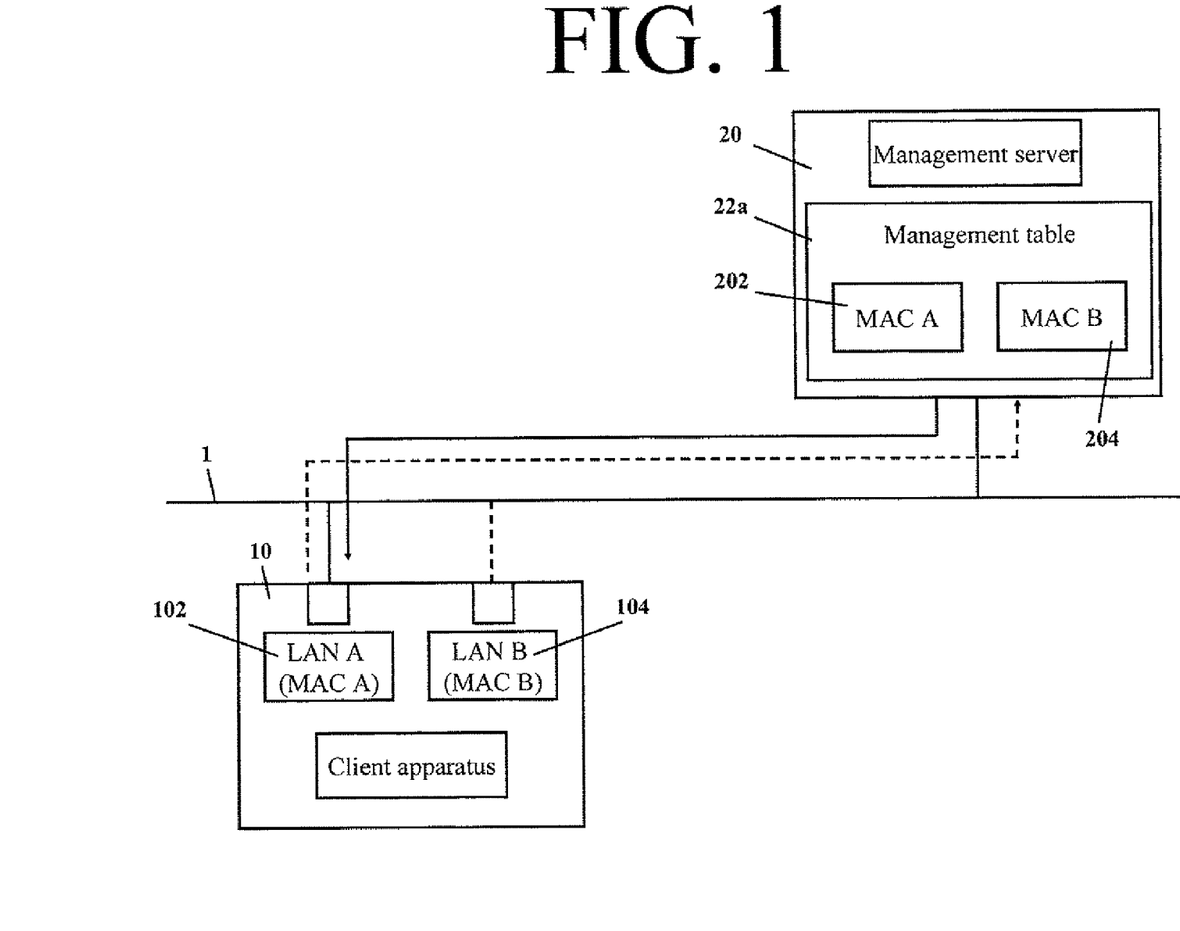
FIG. 1 is a diagram illustrating an overview and a feature of a management server according to a first embodiment.

Overview and Features of Management Server:

Firstly, an overview and features of the management server according to the first embodiment will be described with reference to FIG. 1. FIG. 1 is a diagram illustrating an overview and a feature of the management server according to the first embodiment.

An overview of the management server according to the first embodiment is that the management server performs processing for managing communication with each client apparatus through a network and for responding to a predetermined request received from the client apparatus. A main feature of the management server is that the management server can perform operation corresponding to switching between LAN cards in the client apparatus and can respond to a request from the client apparatus.

The main feature will now be described in more detail. As shown in FIG. 1, the management server is connected to a client apparatus through a LAN (local area network) 1 so as to allow communication.

The client apparatus transmits, for examples a request for staring a PXE (Preboot eXecution Environment) to the management server. The client apparatus is equipped with a LAN card A (LAN A) and a LAN card B (LAN B). The LAN card A and the LAN card B are uniquely assigned corresponding MAC addresses (e.g., MAC A and MAC B), which are used by the client apparatus to communicate with the management server.

The management server has a management table for pre-storing the redundancy MAC addresses in association with the client apparatus. The MAC addresses are used when the client apparatus performs data transmission/reception. With this arrangement, even when one LAN card that is currently used by the client apparatus fails and switching to the other redundant LAN card is performed, the management server can execute response processing that corresponds to a request from the client apparatus in real time.

In practice, however, a LAN card having a MAC address other than the MAC addresses pre-stored in the management table included in the management server may be newly equipped in the client apparatus Thus, a description will be briefly given of processing of the management server when a new MAC address that is not registered in the management table is to be registered in the management table in association with the client apparatus.

That is, when a MAC address indicating the transmission source of a request is not registered in the management server, the management server rejects a request from the client apparatus and, from then on, does not communicate therewith. In order to prevent such a situation, the management server sets its operation mode to a registration mode so as to indiscriminately respond to a request (e.g., a PXE request) from the client apparatus.

For example, upon receiving a PXE packet for the PXE request from the client apparatus, the management server analyzes the PXE packet, obtains a MAC address indicating the transmission source of the PXE packet and checks whether or not the obtained MAC address is already registered in the management table.

When the obtained MAC address is not registered in the management table is confirmed, the management server transmits an agent to the client apparatus to create a list of the MAC addresses of LAN cards equipped in the client apparatus and also cases the agent to transmit the created MAC-address list. Upon receiving the MAC-address list transmitted by the agent, the management server registers all of the received MAC addresses in the management table in association with the client apparatus that is the transmission source of the PXE packet.

That is, all MAC addresses associated with all LAN cards equipped in the client apparatus are registered. Thus, for example, during processing between the client apparatus and the management server, even when the LAN card A that is currently used by the client apparatus fails and switching to the inactive redundant LAN card B is performed, the management server can register the MAC addresses corresponding to the redundancy LAN cards in the client apparatus and also can respond to a request from the client apparatus by performing real-time operation corresponding to the switching between the LAN cards in the client apparatus without suspension of the processing.

Thus, as in the feature described above, the management server according to the first embodiment can perform operation corresponding to the switching between the LAN cards in the client apparatus and can response to a request from the client apparatus.

Figure 2:
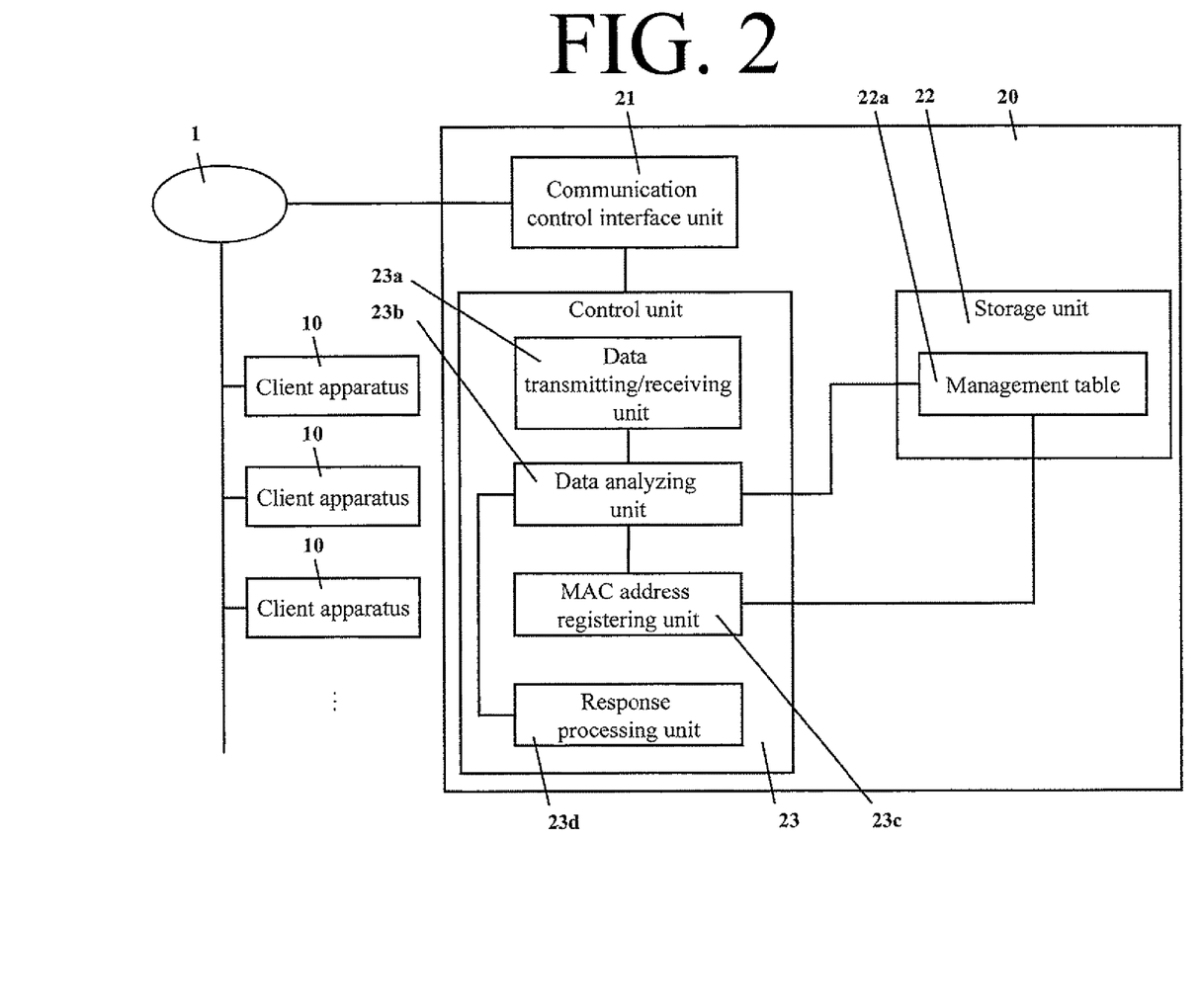
FIG. 2 is a block diagram showing the configuration of the management server according to the first embodiment.

Configuration of Management Server:

The configuration of the management server according to the first embodiment will now be described with reference to FIG. 2. FIG. 2 is a block diagram showing the configuration of the management server according to the first embodiment. As shown, a management server 20 according to the first embodiment is connected to client apparatuses 10 through the LAN 1 so as to allow communication.

As shown in FIG. 2, the management server 20 includes a communication-control interface unit 21, a storage unit 22 and a control unit 23. The communication-control interface unit 21 controls a communication for various types of information exchanged with the client apparatuses 10. The control unit 23 receives a message including updated environment information indicative of addition of an interface device connected to the client apparatus from the client apparatus and updates the environment information in the storage with the updated environment information.

Figure 3:
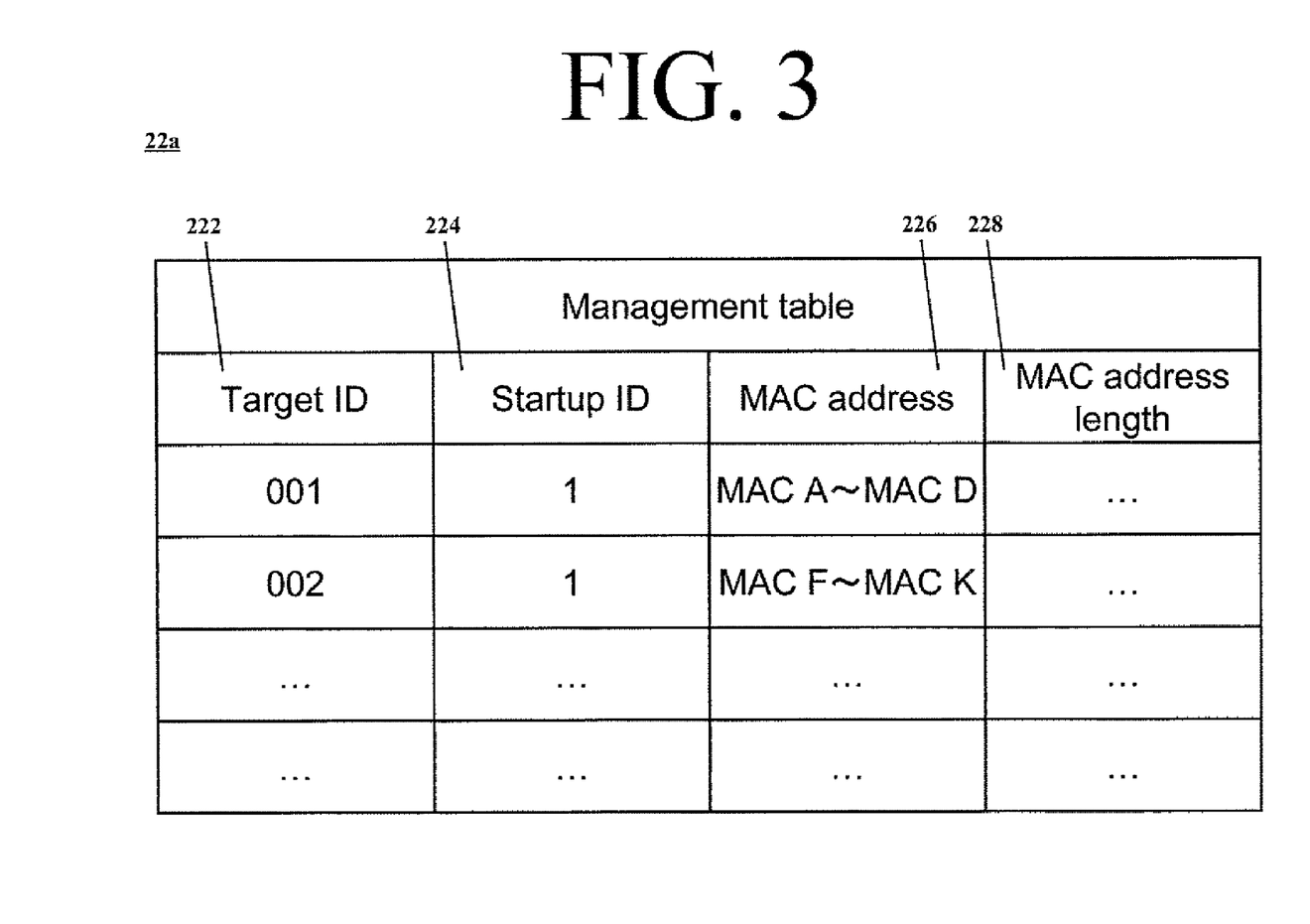
FIG. 3 is a table showing an example of the configuration of the management table according to the first embodiment.

The storage unit 22 stores data and programs required for various types of processing controlled by the control unit 23. And the storage unit 22 particularly includes a management table 22a according to the present technique. More specifically, as illustrated in FIG. 3, the management table 22a stores target IDs 222, startup IDs 224, MAC addresses 226 and MAC-address lengths 228 in association with each other. The storage unit 22 stores environment information in association with each of the client apparatuses.

The target ID has an arbitrary value assigned by the management server 20 during registration of the MAC addresses of the client apparatus 10. The startup ID is information for causing the client apparatus 10 to execute a predetermined startup operation, and a packet specifying a processing description corresponding to the startup ID is exchanged with the client. For example, startup ID "0" indicates a processing description "do nothing", startup ID "1" indicates a processing description "local startup", and startup ID "2" indicates a processing description "PXE startup". The MAC address is information uniquely assigned to each LAN card equipped in each client apparatus 10 and is contained in a packet transmitted when the client apparatus 10 issues a request to the server apparatus 20. The MAC-address length has a value indicating the total length of data lengths of all MAC addresses. The data lengths of the MAC addresses may respectively be stored.

The control unit 23 has an internal memory for storing required data and a program stating various processing procedures. The control unit 23 and the internal memory serve as a processing unit for executing various types of processing. According to the present technique, the control unit 23 includes a data transmitting/receiving unit 23a, a data analyzing unit 23b, a MAC-address registering unit 23c and a response processing unit 23d.

The data transmitting/receiving unit 23a serves a processing unit for receiving a packet for a predetermined request (e.g., a PXE request) transmitted from the client apparatus 10 through the LAN 1. More specifically, for example, the data transmitting/receiving unit 23a sends out the PXE packet, received from the client apparatus 10, to the data analyzing unit 23b. The data transmitting/receiving unit 23a also transmits an agent, received from the data analyzing unit 23b, to the client apparatus 10. Upon receiving the MAC-address list transmitted by the agent, the data transmitting/receiving unit 23a sends out the MAC-address list to the data analyzing unit 23b.

The data analyzing unit 23b serves as a processing unit for analyzing the packet received from the data transmitting/receiving unit 23a. More specifically, for example, the data analyzing unit 23b analyzes the PXE packet received from the data transmitting/receiving unit 23a, obtains a MAC address indicating the transmission source of the PXE packet and checks whether or not the obtained MAC address is already registered in the management table 22a.

Upon confirming that the obtained MAC address is not registered in the management table 22a, the data analyzing unit 23b transmits an agent to the client apparatus 10 via the data transmitting/receiving unit 23a to create a list of the MAC addresses of the LAN cards equipped in the client apparatus 10 and causes the agent to transmit the created MAC-address list. Upon receiving the MAC-address list transmitted by the agent from the data transmitting/receiving unit 23a, the data analyzing unit 23b sends out the MAC-address list to the MAC-address registering unit 23c. After the MAC-address registering unit 23c completes the registration of the MAC addresses, the data analyzing unit 23b issues a request to the response processing unit 23d so as to respond to the request from the client apparatus 10.

On the other hand, upon confirming that the obtained MAC address is registered in the management table 22a and receiving, for example, the PXE packet from the client apparatus 10, the data analyzing unit 23b issues a request to the response processing unit 23d so as to respond to the request from the client apparatus 10.

The MAC-address registering unit 23c servers as a processing unit for registering the MAC addresses in association with each client apparatus. More specifically, the MAC-address registering unit 23c registers, in the management table 22a, the redundancy MAC addresses used when each client apparatus 10 performs data transmission/reception, in association with the client apparatus 10. During the registration, an arbitrarily assigned target ID, a startup ID and a MAC-address length are registered together with MAC addresses.

Upon receiving the MAC-address list from the data analyzing unit 23b, the MAC-address registering unit 23c registers all of the received MAC addresses in the management table 22a in association with the corresponding client apparatus 10.

The response processing unit 23d serves as a processing unit for responding to a predetermined request received from the client apparatus 10. More specifically, for example, the response processing unit 23d receives, from the data analyzing unit 23b, a request for responding to a PXE request, and then executes processing for responding to the request from the client apparatus 10, based on a processing-request procedure composed in accordance with pre-registered processing of the client apparatus.

More specifically, the response processing unit 23d issues, to the client apparatus 10, an instruction for the processing-request procedure composed by the response processing unit 23d, for example, an instruction for causing the client apparatus 10 to operate in order of power ON, data backup, rebooting and HDD startup.

Processing for responding to a request from the client apparatus 10 will now be described with respect to one example of the processing-request procedure. For example, for execution of processing for responding to a request from the client apparatus 10 based on the composed processing-request procedure, the response processing unit 23d first sets the startup ID in the management table 22a to "2" and issues a power-ON instruction set for (1) in the processing-request procedure to the client apparatus 10 via the data transmitting/receiving unit 23a.

Upon receiving the power-ON instruction from the management server 20, the client apparatus 10 is powered up and transmits a PXE packet to the management server 20.

When the management server 20 receives the PXE packet from the client apparatus 10, the data transmitting/receiving unit 23a in the management server 20 sends out the received PXE packet to the data analyzing unit 23b.

The data analyzing unit 23b analyzes the PXE packet received from the data transmitting/receiving unit 23a, obtains a MAC address indicating the transmission source of the PXE packet and checks whether or not the obtained MAC address is already registered in the management table 22a.

Upon confirming that the obtained MAC address is registered in the management table 22a, the data analyzing unit 23b issues a request to the response processing unit 23d so as to respond to the request from the client apparatus 10.

Upon receiving the response-processing request from the data analyzing unit 23b, the response processing unit 23d operates in accordance with the startup ID setted in the management table 22a and transmits a response to the client apparatus 10. That is, the response processing unit 23d issues a data-backup request set for (2) in the processing-request procedure, together with a packet to which startup ID "2" set in the management table 22a, to the client apparatus 10 via the data transmitting/receiving unit 23a.

Upon receiving the data backup request together with the packet from the management server 20, the client apparatus 10 performs PXE startup in accordance with startup ID "2" added to the packet and executes data backup in accordance with the backup instruction. Upon completion of the data backup, the client apparatus 10 transmits a backup completion notification to the management server 20.

Upon receiving the backup completion notification from the client apparatus 10 via the data transmitting/receiving unit 23a, the response processing unit 23d in the management server 20 issues a rebooting request set for (3) in the processing-request procedure to the client apparatus 10 via the data transmitting/receiving unit 23a.

Upon receiving the rebooting request from the management server 20, the client apparatus 10 starts rebooting. Upon completion of the rebooting, the client apparatus 10 causes an agent to transmit a reboot notification to the management server 20.

Upon receiving the reboot notification from the client apparatus 10 via the data transmitting/receiving unit 23a, the response processing unit 23d in the management server 20 sets the startup ID to "1" and waits for reception of a PXE packet from the client apparatus 10.

When a PXE packet is transmitted from the client apparatus 10 to the management server 20, the response processing unit 23d in the management server 20 receives the PXE packet via the data transmitting/receiving unit 23a. The response processing unit 23d then refers to the management table 22a and gives a response by transmitting, to the client 10 via the data transmitting/receiving unit 23a, a packet to which startup ID "1" set for (4) in the processing request procedure is added.

Upon receiving the packet from the management server 20, the client apparatus 10 operates in accordance with the startup ID added to the packet.

Figure 4:
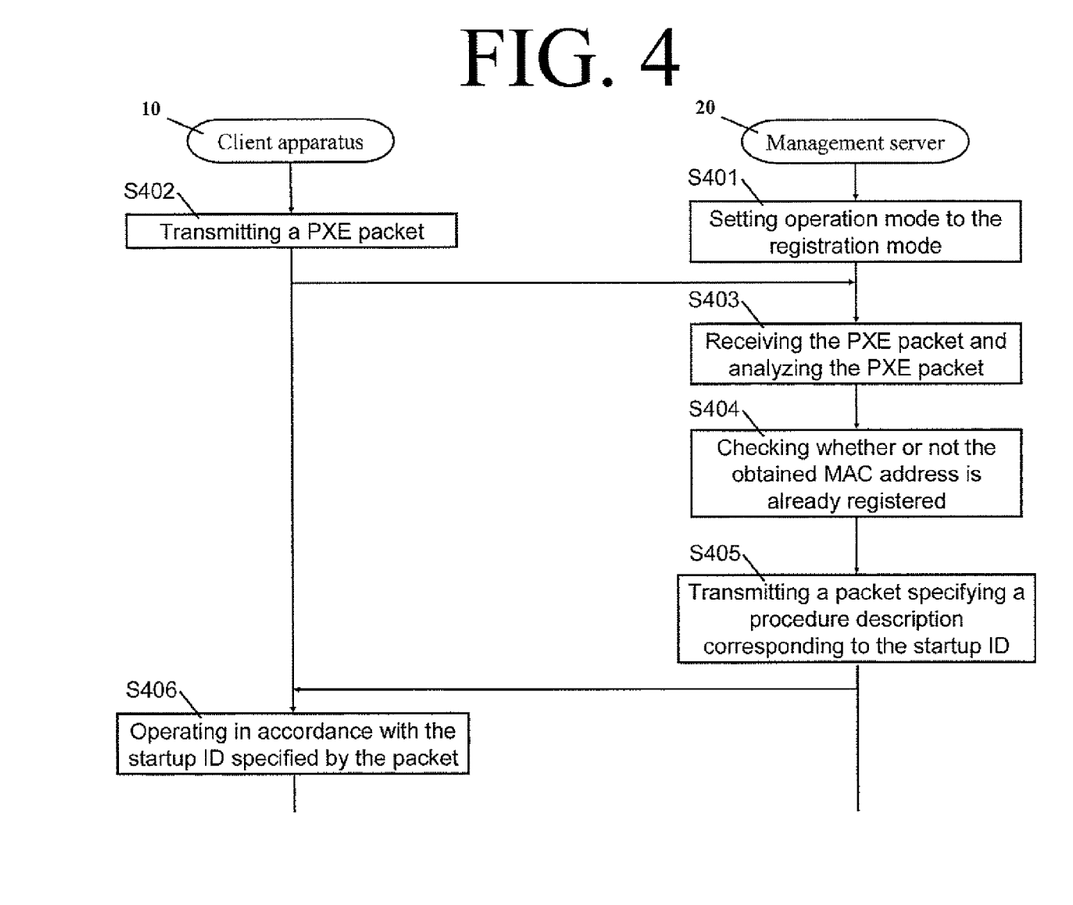
FIG. 4 is a sequence diagram showing the flow of MAC-address registration processing according to the first embodiment.
Figure 5A:
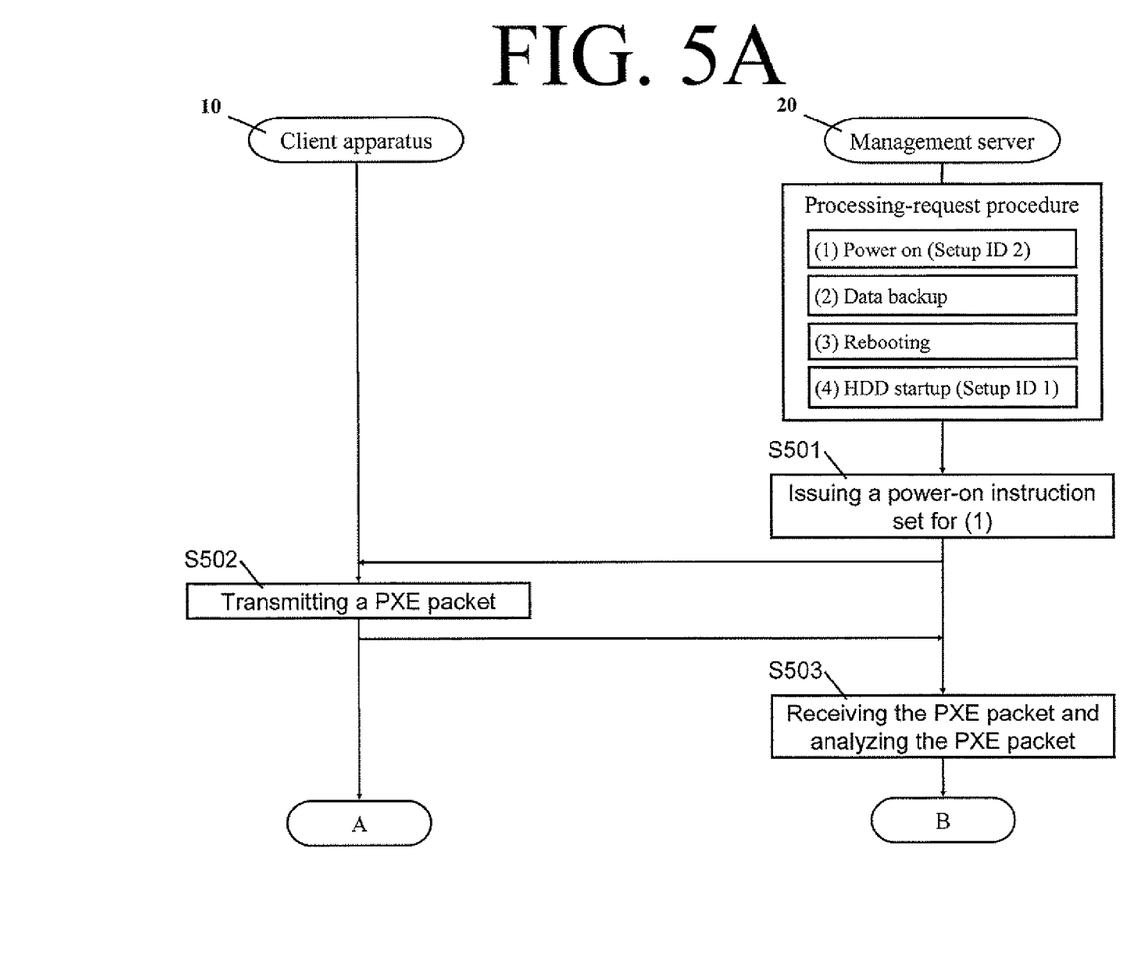
FIGS. 5A and 5B are sequence diagrams showing the flow of response processing according to the first embodiment.
Figure 5B:
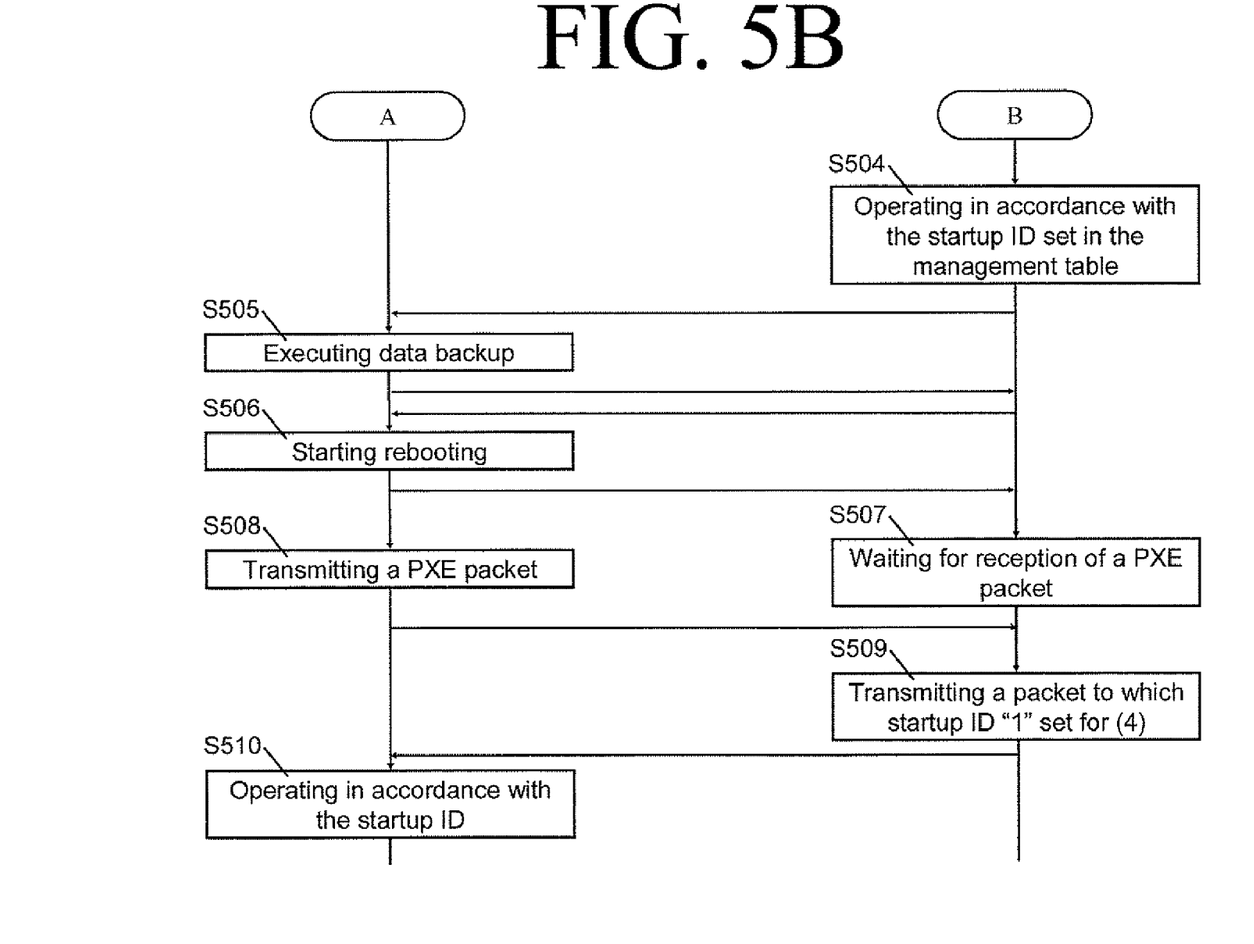

Processing of Management Server:

Processing of the management server according to the first embodiment will now be described with reference to FIGS. 4 and 5. FIG. 4 is a sequence diagram showing the flow of registration processing performed between the management server according to the first embodiment and the client apparatus. FIGS. 5A and 5B are sequence diagrams showing the flow of response processing performed between the management server according to the first embodiment and the client apparatus.

Registration Processing:

Firstly, the flow of registration processing performed between the management server according to the first embodiment and the client apparatus will be described with reference to FIG. 4. When a MAC address indicating the transmission source of a request is not registered in the management server, the management server 20 rejects a request from the client apparatus 10 and, from then on, does not communicate therewith. In order to prevent such a situation, in step S401 shown in FIG. 4, the management server 20 sets the management server's operation mode to the registration mode so as to indiscriminately respond to a request (e.g., a PXE request).

Subsequently, for example, when the client apparatus 10 is manually powered up, the client apparatus 10 transmits a PXE packet for a PXE request to the management server 20 in step S402.

In step S403, the management server 20 receives the PXE packet from the client apparatus 10 and the data analyzing unit 23b in the management server 20 analyzes the PXE packet. In step S404, the data analyzing unit 23b obtains a MAC address indicating the transmission source of the PXE packet and checks whether or not the obtained MAC address is already registered in the management table 22a.

Upon confirming that the obtained MAC address is not registered in the management table 22a, the data analyzing unit 23b in the management server 20 transmits an agent to the client apparatus 10 to create a list of the MAC addressees of LAN cards equipped in the client apparatus 10 and causes the agent to transmit the created MAC-address list. Upon receiving the MAC-address list transmitted by the agent, the data analyzing unit 23b sends out the MAC-address list to the MAC-address registering unit 23c.

Upon receiving the MAC-address list from the data analyzing unit 23b, the MAC-address registering unit 23c registers all of the received MAC addresses in the management table 22a in association with the corresponding client apparatus 10.

After the MAC-address registering unit 23c completes the registration of the MAC addresses, as described above, the data analyzing unit 23b issues a request to the response processing unit 23d so as to respond to a request from the client apparatus 10.

Upon receiving the response request for the PXE request from the data analyzing unit 23b, the response processing unit 23d executes processing for responding to the request from the client apparatus 10, based on a response procedure composed in accordance with a pre-registered request from the client apparatus 10.

For example, in step S405, the response processing unit 23d refers to the management table 22a to transmit, to the client 10, a packet specifying a procedure description corresponding to the startup ID set in the management table 22a.

Upon receiving the packet from the management server 20, in step S406, the client apparatus 10 operates in accordance with the startup ID specified by the packet.

Response Processing:

The flow of response processing performed between the management server according to the first embodiment and the client apparatus will now be described with reference to FIGS. 5A and 5B. As shown, the response processing unit 23d in the management server 20 composes a processing-request procedure so as to cause the client apparatus 10 to operate, for example, in order of power ON, data backup, rebooting and HDD startup.

For execution of processing for responding to a request from the client apparatus 10 based on the composed processing-request procedure, the response processing unit 23d first sets the startup ID in the management table 22a to "2" and issues a power-ON instruction set for (1) in the processing-request procedure to the client apparatus 10 in step S501.

Upon receiving the power-ON instruction from the management server 20, the client apparatus 10 is powered up and transmits a PXE packet to the management server 20 in step S502.

In step S503, the data analyzing unit 23b receives the PXE packet from the client apparatus 10 and analyzes the PXE packet. The data analyzing unit 23b obtains a MAC address indicating the transmission source of the PXE packet and checks whether or not the obtained MAC address is already registered in the management table 22a.

Upon confirming that the obtained MAC address is registered in the management table 22a, the data analyzing unit 23b issues a request to the response processing unit 23d so as to respond to the request from the client apparatus 10. On the other hand, upon confirming that the obtained MAC address is not registered in the management table 22a, the data analyzing unit 23b executes the registration processing, as described above (see FIG. 4).

Upon receiving the response-processing request from the data analyzing unit 23b, the response processing unit 23d operates in accordance with the startup ID set in the management table 22a and responds to the client apparatus 10 in step S504. That is, the response processing unit 23d issues a data-backup request set for (2) in the processing-request procedure, together with a packet to which startup ID "2" set in the management table 22a is added, to the client apparatus 10 via the data transmitting/receiving unit 23a.

Upon receiving the data backup request together with the packet from the management server 20, the client apparatus 10 performs PXE startup in accordance with startup ID "2" added to the packet and also executes data backup in accordance with the backup instruction in step S505. Upon completion of the data backup, the client apparatus 10 then transmits a backup completion notification to the management server 20.

Upon receiving the backup completion notification from the client apparatus 10, the response processing unit 23d in the management server 20 issues a request for (3) rebooting set in the processing-request procedure to the client apparatus 10.

Upon receiving the rebooting request from the management server 20, the client apparatus 10 starts rebooting in step S506. Upon completion of the rebooting, the client apparatus 10 causes an agent to transmit a reboot notification to the management server 20.

When the management server 20 receives the reboot notification from the client apparatus 10, the response processing unit 23d sets the startup ID in the management table 22a to "1" and waits for reception of a PXE packet transmitted from the client apparatus 10 in step S507.

When a PXE packet is transmitted from the client apparatus 10 to the management server 20 in step S508, the management server 20 receives the PXE packet. The response processing unit 23*d* refers to the management table 22*a* and issues a response in step S509 by transmitting, to the client apparatus 10, a packet to which startup ID "1" set for (4) in the processing-request procedure is added.

Upon receiving the packet from the management server 20, the client apparatus 10 operates in accordance with the startup ID specified by the packet in step S510.

Advantages of First Embodiment

As described above, according to the first embodiment, the management server performs processing for managing communication with each client apparatus through the network and for responding to a predetermined request received from the client apparatus. In addition, the management server pre-stores information (e.g., redundancy MAC addresses) used when the client apparatus performs data transmission/reception, in association with each client apparatus. Upon receiving a predetermined request from the client apparatus, the management server checks whether or not transmission-source information (e.g., the MAC address of a transmission source) indicating the transmission source of the received predetermined request is included in the pre-stored information. Upon confirming that the transmission-source information is not included in the pre-stored information, the management apparatus obtains, from the client apparatus that is the transmission source of the predetermined request, all information used when the client apparatus performs data transmission/reception. The management server then registers the obtained information in association with the client apparatus that is the transmission source of the predetermined request. Thus, for example, during processing between the client apparatus and the management server, even when a LAN card that is currently used by the client apparatus fails and switching to an inactive redundant LAN card is performed, the management server can register MAC addresses corresponding to the redundancy LAN cards in the client apparatus without suspension of the processing and also can respond to a request from the client apparatus by performing real-time operation corresponding to the switching between the LAN cards in the client apparatus.

According to the first embodiment, when the MAC addresses obtained from the client apparatus are to be registered in association with the client apparatus that is the transmission-source of a predetermined request, the data length(s) of the obtained MAC addresses is also registered together with the MAC addresses. Thus, it is possible to register the MAC addresses in a state in which each MAC address can be easily identified.

According to the first embodiment, for example, upon confirming that a MAC address indicating the transmission source of a predetermined request is included in the pre-stored MAC addresses, the management apparatus executes processing for responding to the predetermined request. Thus, for example, even when a LAN card that is currently used by the client apparatus fails and switching to another redundant LAN card is performed, the management apparatus can execute response processing that corresponds to the request from the client apparatus in real time.

According to the first embodiment, the response processing is executed based on a preset processing sequence in accordance with a predetermined request received from the client apparatus. Thus, the management apparatus can set a startup ID and so on for processing to be executed by the client apparatus and also can smoothly execute response processing that corresponds to the request from the client apparatus.

Although a case in which redundancy MAC addresses used when a client apparatus performs data transmission/reception are stored has been described in the first embodiment, the present technique is not limited thereto. For example, the present technique is similarly applicable to a case in which multiple redundancy pieces of information, instead of the MAC addresses, are stored.

Other Embodiments

Although one embodiment of the present technique has been described above, the present technique may be carried out in various forms other than the above-described embodiment. Thus, other embodiments encompassed by the present technique will be described below.

Apparatus Configuration, Etc:

The elements of the management server 20 illustrated in FIG. 2 are merely functionally conceptual, and do not necessarily have to be physically configured as illustrated. That is, the distribution and integration of the elements of the management server 20 are not limited to the illustrated configuration, and all or some of the elements can be functionally or physically distributed or integrated in any form in accordance with loads, the use state, and so on.

For example, the data analyzing unit 23*b* and the MAC-address registering unit 23*c* may be integrated together. In addition, all or some of the processing functions accomplished by the management server 20 can be realized by a CPU and a program analyzed and executed thereby or can be realized by wired-logic-based hardware.

Figure 6:
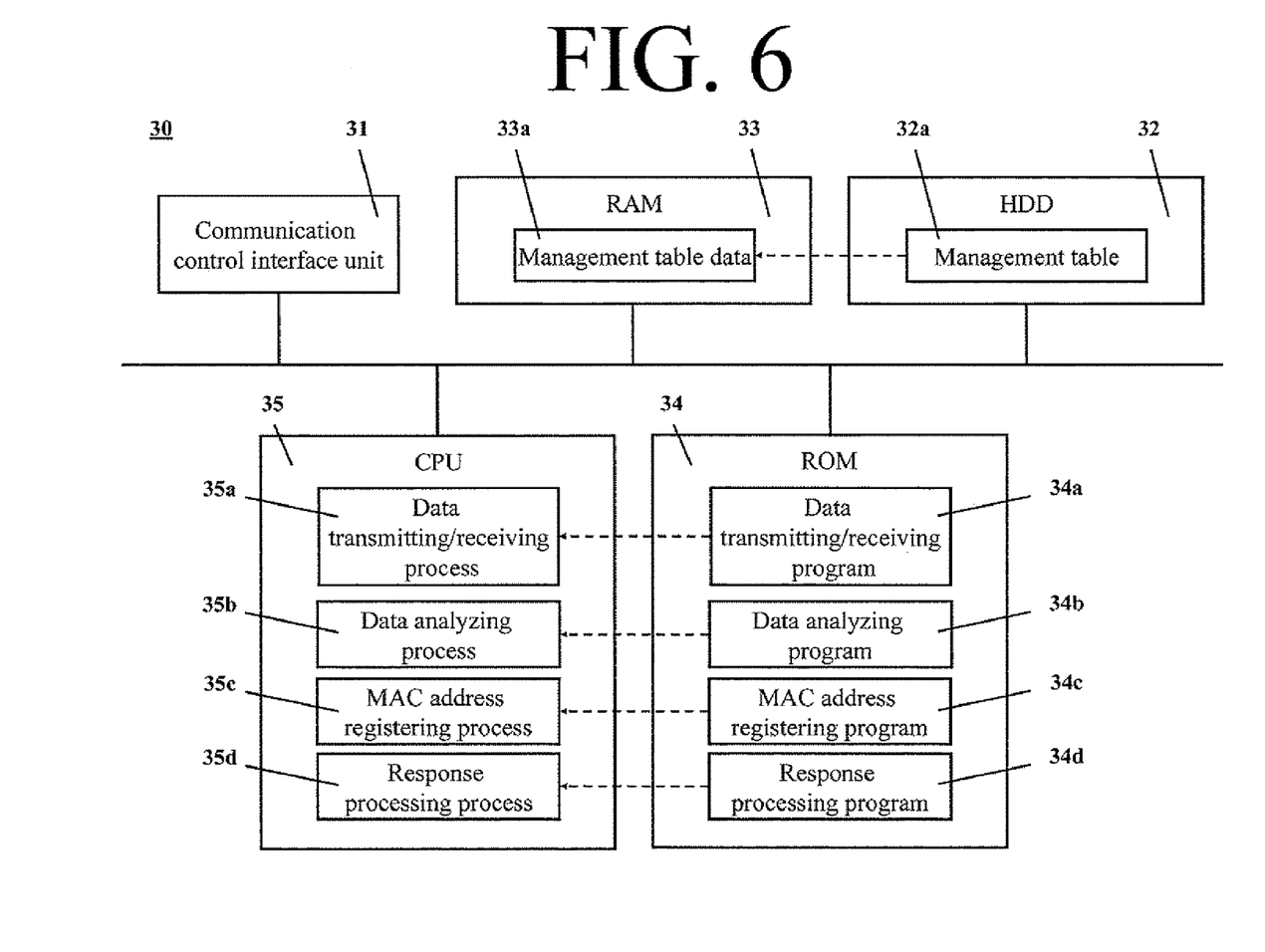
FIG. 6 is a diagram showing a computer for executing a communication management program.

Communication Management Program:

The processing (see FIGS. 4 and 5) described in the first embodiment can be accomplished by causing a computer system, such as a personal computer or a work station, to execute a prepared program. Thus, one example of a computer for executing a communication management program having functions that are analogous to those of the first embodiment will be described below with reference to FIG. 6. FIG. 6 is a diagram showing the computer for executing the communication management program.

As shown in FIG. 6, a computer 30 serves as a management server and includes a communication-control interface unit 31, a HDD 32, a RAM 33, a ROM 34, and a CPU 35, which are connected to each other via a bus 40.

The ROM 34 pre-stores a communication management program that provides functions that are analogous to those of the management server 20 according to the first embodiment, i.e., pre-stores a data transmitting/receiving program 34*a*, a data analyzing program 34*b*, a MAC-address registering program 34*c*, and a response processing program 34*d*, as shown in FIG. 6. The programs 34*a*, 34*b*, 34*c*, and 34*d* may be appropriately integrated together or distributed, in the same manner as the elements of the management server 20 shown in FIG. 2. The ROM 34 may be a nonvolatile RAM.

The CPU 35 reads the programs 34*a*, 34*b*, 34*c*, and 34*d* from the ROM 34 and executes the programs to thereby cause the programs to act as a data transmitting/receiving process 35*a*, a data analyzing process 35*b*, a MAC-address registering process 35*c*, and a response processing process 35*d*, as shown in FIG. 6. The processes 35*a*, 35*b*, 35*c*, and 35*d* correspond to the data transmitting/receiving unit 23*a*, the data analyzing unit 23*b*, the MAC-address registering unit 23*c*, and the response processing unit 23*d*, respectively in the management server 20 shown in FIG. 2.

The HDD 32 stores a management table 32, as shown in FIG. 6. The management table 32a corresponds to the management table 22a shown in FIG. 2. The CPU 35 reads management table data 33a from the management table 32a, stores the read management table data 33a in the RAM 33, and executes processing based on the management table data 33a stored in the RAM 33.

The programs 34a, 34b, 34c, and 34d do not necessarily have to be pre-stored in the ROM 34. For example, the programs may be stored on a portable physical medium (e.g., a flexible disk (FD), CD-ROM, DVD disk, magneto-optical disk, or IC card) to be inserted into the computer 30 or a fixed physical medium (e.g., a HDD) provided inside or outside the computer 30 or may be stored on another computer (or a server) connected to the computer 30 through a public line, the Internet, a LAN, or a WAN (wide area network) so that the computer 30 reads the programs therefrom and executes the programs.

According to the present technique, the management server performs processing for managing communication with each client apparatus through the network and for responding to a predetermined request received from the client apparatus. In addition, the management server pre-stores information (e.g., redundancy MAC addresses) used when the client apparatuses perform data transmission/reception, in association with each client apparatus. Upon receiving a predetermined request from the client apparatus, the management server checks whether or not transmission-source information (e.g., the MAC address of a transmission source) indicating the transmission source of the received predetermined request is included in the pre-stored information. Upon confirming that the transmission-source information is not included in the pre-stored information, the management apparatus obtains, from the client apparatus that is the transmission source of the predetermined request, all information used when the client apparatus performs data transmission/reception. The management server then registers the obtained information in association with the client apparatus that is the transmission source of the predetermined request. Thus, for example, during processing between the client apparatus and the management server, even when a LAN card that is currently used by the client apparatus fails and switching to an inactive redundant LAN card is performed, the management server can register MAC addresses corresponding to the redundancy LAN cards in the client apparatus without suspension of the processing and also can respond to a request from the client apparatus by performing real-time operation corresponding to the switching between the LAN cards in the client apparatus.

According to the present technique, when the MAC addresses obtained from the client apparatus are to be registered in association with the client apparatus that is the transmission-source of a predetermined request, the data length(s) of the obtained MAC addresses is also registered together with the MAC addresses. Thus, it is possible to register the MAC addresses in a state in which each MAC address can be easily identified.

According to the present technique, for example, upon confirming that a MAC address indicating the transmission source of a predetermined request is included in the pre-stored MAC addresses, the management apparatus executes processing for responding to the predetermined request. Thus, for example, even when a LAN card that is currently used by the client apparatus fails and switching to another redundant LAN card is performed, the management apparatus can execute response processing that corresponds to the request from the client apparatus in real time.

According to the present technique, the response processing is executed based on a preset processing sequence in accordance with a predetermined request received from the client apparatus. Thus, the management apparatus can set a startup ID and so on for processing to be executed by the client apparatus and also can smoothly execute response processing that corresponds to a request from the client apparatus.

As described above, the communication management program, the communication management method, and the communication management apparatus according to the present technique are useful for a communication management program for causing a computer to execute processing for managing communication with client apparatuses through a network and for responding to a predetermined request received from each client apparatus and also for a communication management method and a communication management apparatus which implement the communication management program. In particular, the communication management program, the communication management method, and the communication management apparatus according to the present technique can operation corresponding to switching between LAN cards in the client apparatus and are suitable for an application for responding to a request from the client application.

What is claimed is:

1. A server apparatus connected to a client apparatus, the server apparatus comprising:
   a storage that stores address information in association with each of interface devices included in the client apparatus; and
   a processor that
      receives a packet including address information from the client apparatus,
      executes processing in accordance with the received packet when the address information included in the received packet is stored in the storage,
      requests a list to the client apparatus when the address information included in the received packet is not stored in the storage, the list including the address information of the interface devices included in the client apparatus, and
      when the processor receives the list, stores the address information included in the received list into the storage.

2. The server apparatus of claim 1, wherein the address information is a MAC address.

3. A method of controlling a server apparatus connected to a client apparatus, the server apparatus including a storage for storing address information in association with each of interface devices included in the client apparatus, the method comprising:
   receiving, by the server apparatus, a packet including address information from the client apparatus;
   executing, by the server apparatus, processing in accordance with the received packet when the address information included in the received packet is stored in the storage;
   requesting, by the server apparatus, a list to the client apparatus when the address information included in the received packet is not stored in the storage, the list including the address information of the interface devices included in the client apparatus; and
   when receiving the list by the server apparatus, storing the address information included in the received list into the storage.

4. The method of claim 3, wherein the address information is a MAC address.

5. A non-transitory computer-readable storage medium that stores a computer program for controlling a server apparatus connected to a client apparatus, the server apparatus including a storage for storing address information in association with each of interface devices included in the client apparatus, the computer program, performed by a computer, causing a process comprising:

receiving, by the server apparatus, a packet including address information from the client apparatus;

executing, by the server apparatus, processing in accordance with the received packet when the address information included in the received packet is stored in the storage;

requesting, by the server apparatus, a list to the client apparatus when the address information included in the received packet is not stored in the storage, the list including the address information of the interface devices included in the client apparatus; and when receiving the list by the server apparatus, storing the address information included in the received list into the storage.

6. The non-transitory computer-readable storage medium of claim 5, wherein the address information is a MAC address.

* * * * *